Oct. 7, 1969 M. J. F. HERVE 3,471,655

NEGATIVE FEEDBACK PHONOGRAPH PICK-UP ARM SYSTEMS

Filed June 23, 1966 2 Sheets-Sheet 1

United States Patent Office 3,471,655
Patented Oct. 7, 1969

3,471,655
NEGATIVE FEEDBACK PHONOGRAPH PICK-UP ARM SYSTEMS

Marcel J. F. Herve, 55 Rue Lacordaire, Paris, France
Filed June 23, 1966, Ser. No. 559,846
Claims priority, application France, July 2, 1965, 23,203
Int. Cl. G11b *3/44*
U.S. Cl. 179—100.4 7 Claims

ABSTRACT OF THE DISCLOSURE

A phonograph pick-up arm system has a pick-up arm mounted on a pivot and a pick-up head at its free end fitted with a stylus and mechano-electric transducer providing audio signals which are fed to a D.C. amplifier. The D.C. current component from the amplifier output is fed to a D.C. motor whose shaft is coupled to the pick-up arm pivot. A negative feed-back is thus provided to restore the stylus and pick-up head to correct its position when deflected by lateral forces on the stylus.

Figures 1, 2:
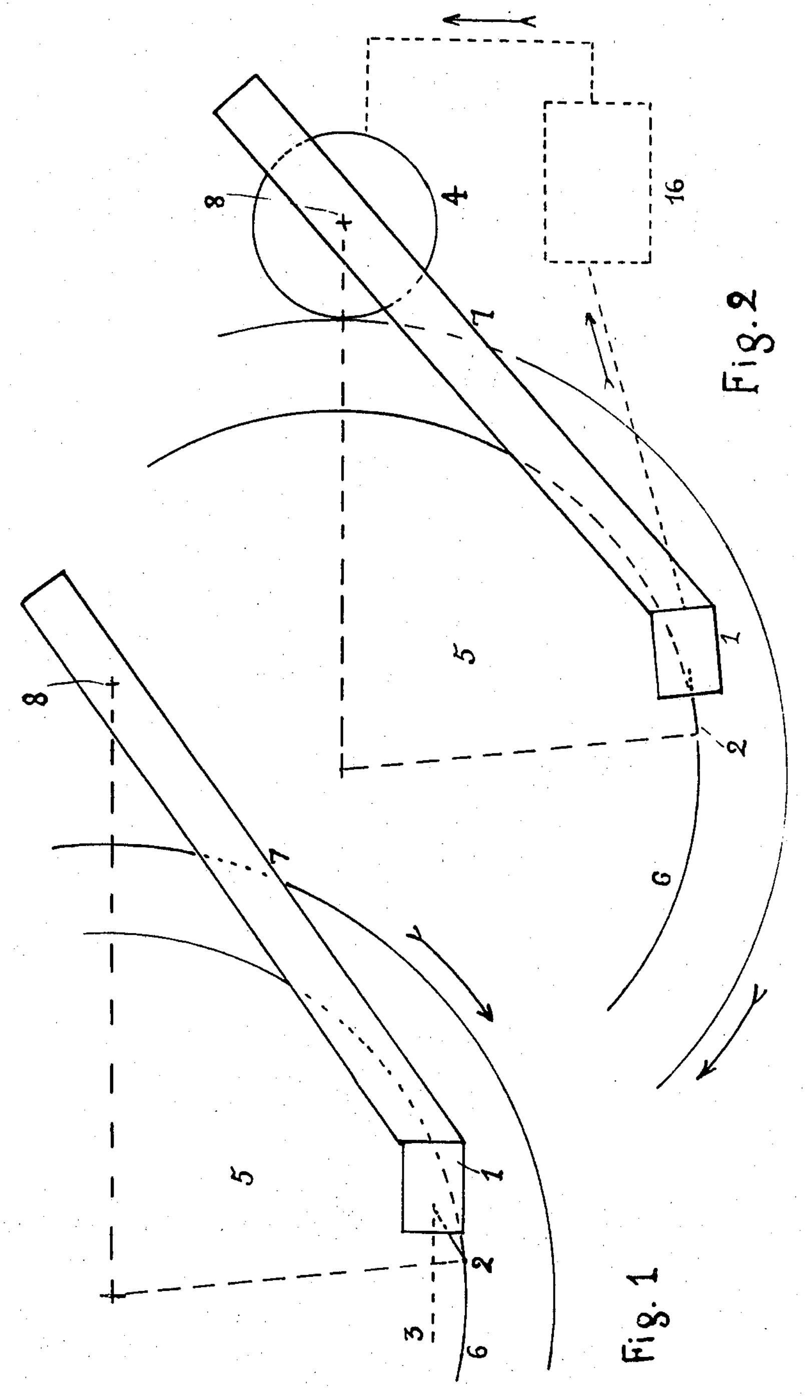

The present invention relates to phonograph pick-up arm system and has for an object, improvements therein.

When a phonograph pick arm having a pick-up head at its free end is set in its working position, the stylus of the cell explores or tracks the engraved groove. The stylus should be urged towards the bottom of the groove to be stable therein, meanwhile the vertical force which keeps it downward causes a friction between the stylus and the record. The friction force is tangential to the groove and may be divided into two forces: one normal to the pick-up arm at its free end and in most cases directed towards the centre of the turntable, the other passing through the arm pivot and without effect on its equilibrium.

The normal force causes the stylus tip to be pressed against the inside wall of the groove, i.e., towards the record centre while it is rotating. The reaction from the record represents an opposing force whereby the moving part of the pick-up head is submitted to a permanent biassing torque the value of which changes as the head moves from the periphery to the centre of the record. This torque is prejudicial to a good reproduction of the record and is accompanied by a wearing of both the record and the stylus tip.

To prevent or minimise these drawbacks, certain systems have been proposed in which another torque is opposed to that referred to above, by applying to the pick-arm a force directed outwardly for instance by means of a small weight attached to the arm through a cord passing over a fixed pulley.

Such a correcting system is unfortunately delicate in handling and the resulting torque does not vary in the same way as the unwanted one and cannot exactly counteract it.

The present invention has for an object to create a correcting torque almost exactly equal in value but opposite in direction to the said biassing torque, by fixing the pivot shaft of the arm to the shaft of an electric motor procuring by the means of an angular type servo-mechanism a correcting torque opposing the biassing torque.

A servo-mechanism according to the invention comprises the following elements:

(1) A record tracking pick-up head comprising a transducer sensitive to the continuous component of movement transmitted to it by the stylus, (2) A detector converting this continuous component into an electric voltage, (3) An amplifier for said votlage for controlling the rotor movement of a D.C. motor that transfers a torque to the pick-up arm pivot.

In this way, when the equipment is set in operation, the pick-up head is submitted to a lateral pressure due to the reaction of the record groove; a continuous electric component (positive or negative depending on the direction of the pressure) appears, is amplified and actuates the motor which by applying a torque to the arm, provided the electric connections are properly made, urges the arm into a position in which the biassing torque is minimised.

Figure 3:
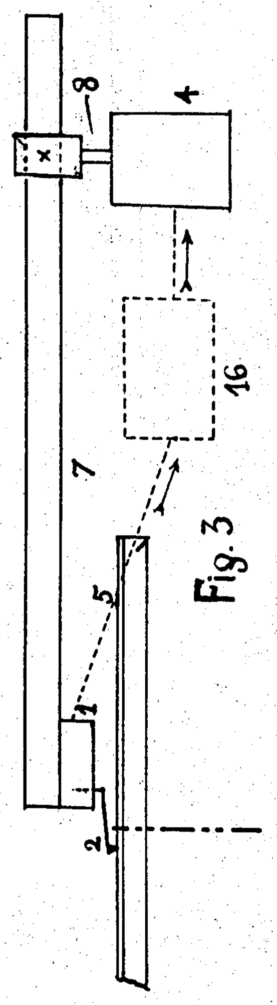
Figure 4:
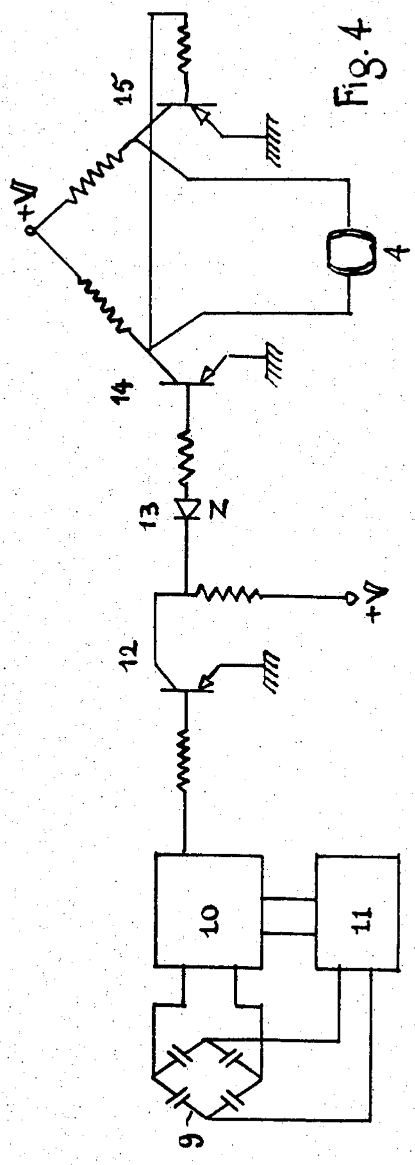

In order that the invention may be more clearly understood, reference will now be made to the accompanying drawings showing by way of example, one embodiment of the invention compared with the example of the prior art, and in which:

FIGURE 1 shows a conventional phonograph arm with the pick-up head in position in a record, FIGURE 2 shows an arm according to the invention, in its working position, in plan, FIGURE 3 shows a side view of the arm of FIGURE 2, and FIGURE 4 is a schematic electrical diagram showing the operation of the arm of FIGURES 2 and 3.

Referring now to the drawings, FIGURE 1 shows a conventional phonograph arm 7 in position on a record 5: this arm has no correcting torque applied thereto. At its free end the arm carries a pick-up head 1 with a stylus 2 which is angularly displaced with respect to its normal position 3. The groove being tracked is indicated at 6, and the arm pivot is shown at 8.

In FIGURES 2 and 3, which represents a servo arm according to the invention in its working position, a motor 4 has created a torque that maintains the stylus 2 in its normal position; the stylus and the radius of the record at the stylus tip make an angle of 90°. The dotted rectangle 16 represents the servo-mechanism provided in accordance with the invention and will be explained with reference to FIGURE 4 which shows one embodiment of such electric servo link. In FIGURE 4, 9 indicates the transducer, i.e., the pick-up head cartridge, 10 a synchronous amplifier and 11 an oscillator.

Transistors 12, 14 and 15 form parts of a power amplifier for driving the motor 4, and 13 may be an electric cell or battery or, as illustrated, a Zener diode, passing only the variations in the current.

The residual error on the correct position of the stylus, may be made very small and depends only on the electric power actuating the motor, that is to say, of the amplifier gain which drives it.

The motor should be a direct current one, so as to be drivable in either direction, depending on the sign of the current delivered by the amplifier, finally depending on the sign of the biassing or friction torque on the stylus when the record is rotating.

A motor particularly interesting for this application is of the moving coil type, combining without play a sufficient angular displacement and a torque proportional to the controlling voltage.

A transducer securing satisfactory results is of the type comprising a variable capacitor bridge excited across one diagonal by an alternating voltage, the frequency of which is sufficiently high, e.g., of the order of a few hundred kilocycles.

The sound signal and the controlling signal appears across the other diagonal of the bridge.

These signals which give a measure of the positions of the stylus with respect to a mean position, are amplified as high frequency voltages and then applied to a synchronous demodulator (e.g., a pentagrid vacuum tube, or a diode ring demodulator) that restores both components, viz. the audio component and the continuous or very low frequency component, this latter corresponding to the slow movements of the stylus.

The audio component is amplified and is fed to the loud-speaker system.

The continuous or low frequency component is amplified in an amplifier of which at least the output stage is symmetrical to prevent any current passing in the motor when the stylus is in its normal or rest position. Such an amplifier may be advantageously constituted by power transistors, as is well known in the art.

This type of servo control may be applied with but slight changes to other kinds of pick-up head systems, for instance, those that conduct the pick-up along a radius of the record. It may be used for other angular servo controls provided that the movement actuates a convenient transducer.

It is also possible to separate the functions of reproducing the sound and controlling the arm and to design a sensitive system used only for control, having a size and inertia large enough and being equipped with a pick-up head used only to pick up the sound signal, transferring to the control device only the slow motions necessary for controlling the arm.

I claim:

1. A phonograph pick-up arm system comprising a pick-up arm mounted on a pivot and having at its free end a pick-up head fitted with a stylus and mechano-electric transducer providing audio signals, a direct current amplifier being fed with said audio signals, and supplying the direct current component of said signals to a direct current motor arranged to actuate said pivot so as to continuously correct any malplacement of the pick-up head and of its stylus with respect to the groove of the phonograph record.

2. A system according to claim 1, wherein said transducer comprises a detector formed by a bridge of four simultaneously variable condensers, energized across a diagonal of the bridge by a high frequency voltage, and a high frequency amplifier of the voltage produced by the detector, followed by a synchronous demodulator feeding said direct current amplifier.

3. A system according to claim 2, wherein said direct current motor is a brushless direct current motor of the moving coil type, whose shaft drives said pivot.

4. A system according to claim 1, comprising a detector to detect slow movements of said stylus, said amplifier and motor being arranged to control said arm to reduce the lateral force resulting from the friction between the stylus tip and the record groove which press said stylus tip against the groove wall.

5. A phonograph pick-up arm system, comprising a pick-up arm having a pick-up head mounted thereon and fitted with a stylus to track a record groove to provide audio signals representing the information contained in said groove, a servo control system sensitive to lateral forces on said stylus and operative to apply a restoring torque to said stylus to reduce said lateral forces, a detector to detect the slow movements of said stylus, said detector including a four-capacitor bridge, means for feeding one diagonal of said bridge with a high frequency voltage, a high frequency amplifier, a synchronous demodulator, a direct current amplifier connected to control a direct current motor of the moving coil type, arranged in a mechanical and electric loop, the signal delivered by said detector and amplified by said amplifier controlling the movement of said motor substantially to prevent said phono arm from pressing the tip of said stylus against the wall of the record groove.

6. A system according to claim 1, wherein said pick-up arm is of the rotating type.

7. A system according to claim 1, wherein said pick-up arm is of the radial type.

References Cited

UNITED STATES PATENTS

| | | | |
|---|---|---|---|
| 1,732,393 | 10/1929 | Andrews | 179—100.4 |
| 2,357,026 | 8/1944 | Scherbatskoy | 179—100.4 |
| 2,858,373 | 10/1958 | Hollmann | 179—100.4 |
| 3,325,603 | 6/1967 | Rabinow et al. | 179—100.41 |

BERNARD KONICK, Pimary Examiner

R. F. CARDILLO, Jr., Assistant Examiner

U.S. Cl. X.R.

179—100.41